2,848,476

PROCESS FOR PREPARING OMEGA-CHLORONITRILES FROM CYANOGEN CHLORIDE AND ETHYLENE

William L. Kohlhase, Wilmington, Del., and Theodore F. Martens, West Chester, Pa., assignors to E. I. du Pont de Nemours and Company, Wilmington, Del., a corporation of Delaware No Drawing. Application October 31, 1956
Serial No. 619,397

7 Claims. (Cl. 260—465.3)

This invention relates to an improvement in processes for preparing omega-chloronitriles of the formula $Cl(CH_2CH_2)_nCN$ by a free-radical-initiated reaction of cyanogen chloride with ethylene under super-atmospheric pressure, and is more particularly concerned with a method of increasing the product yield with a salt of a basic metal oxide and a weak acid.

French Patent No. 1,096,992 of February 9, 1955, issued to Deutsche Gold- und Silver-Scheideanstalt discloses that cyanogen chloride reacts with ethylene under pressures of 50 to 500 atmospheres at temperatures of 90° to 180° C. in the presence of radical-forming polymerization catalysts to produce a mixture of ω-chloronitriles of the formula $Cl(CH_2CH_2)_nCN$ in which the value of $n$ is from 1 to 6. Suitable catalysts are disclosed as being peroxides, redox catalysts and aliphatic azo compounds, of which several specific illustrations are given. A large number of free-radical-forming polymerization catalysts of these types are known.

The type of reaction disclosed in the French patent is commonly referred to as a telomerization and the products are called telomers. The free-radical-forming material is decomposed during the reaction and is more appropriately referred to as an initiator rather than a catalyst. These terms will be used hereinafter.

In the telomerization of cyanogen chloride and ethylene, uneconomically low yields of telomers have been obtained. The prior art reports yields of about 10 g. of telomers per gram of initiator used in batch telomerizations, with only a small fraction of the cyanogen chloride reacting, and the yield in continuous operation was even lower. Unreacted cyanogen chloride and ethylene can be separated from the products and used again, but the initiator cannot be recovered for reuse and efficient use of it is important.

The French patent teaches that the molecular weight distribution of the telomers obtained depends upon the quantity of initiator employed, the temperature and the ratio of cyanogen chloride to ethylene. The latter ratio, as is explained more fully in Hanford and Joyce, U. S. Patent, No. 2,440,800, issued May 4, 1948, and assigned to applicant's assignee, is determined by the ethylene pressure used. These conditions, which will be called primary operating conditions, will usually be dictated by the necessity of producing the most valuable molecular weight distribution. Hence, although these primary conditions also affect the total yield of telomer products obtained, other means are desirable for increasing the total yield.

It is an object of this invention to provide a process by which improved total yields are obtained in the telomerization of cyanogen chloride and ethylene. A further object is to improve the yields obtained under a given set of primary operating conditions. Other objects of the invention will become apparent from the specification and claims.

In accordance with this invention, it has been found that the total yield of omega-chloronitrile telomers of the formula $Cl(CH_2CH_2)_nCN$, wherein $n$ is an integer from 1 to 6, obtained from cyanogen chloride and ethylene with a given set of primary operating conditions, in the range of 50 to 500 atmospheres of ethylene pressure and 65° to 190° C. temperature, can be increased markedly by treating the cyanogen chloride with an alkaline salt of a basic metal oxide and a weak acid. The salt can be added with the cyanogen chloride to the telomerization reaction or the cyanogen chloride can be treated with the salt, distilled, and then be used in the reaction. Cyanogen chloride which has been treated with salt can be recovered from reaction products and reused in additional telomerization reactions without further treatment with the salt. A surprising improvement in total yield is obtained in any of these ways.

The reason for the improvement is not understood but the salt apparently neutralizes acid constituents which interfere in the reaction. Water is also undesirable in the reaction, so the salt should not be one which reacts to form water. These requirements are fulfilled by any alkaline salt of a basic metal oxide and a weak acid. Especially useful are the salts of the alkali (group I of the periodic system) or alkaline earth (group II of the periodic system) basic metal oxides and weak inorganic acids, such as cyanides and normal carbonates. The most effective results are obtained by treating the cyanogen chloride with 0.05 to 10% by weight of the salt. The presence of larger amounts in the reaction mixture may cause tar formation and is unnecessary in any event.

The following examples illustrate specific embodiments of the invention.

EXAMPLE 1

A 325 cc., silver-lined shaker tube, capable of withstanding high pressures, was purged three times with nitrogen, evacuated to about 0.5 mm. of mercury absolute pressure, and then cooled in a mixture of ice and water. The tube was charged with 100 cc. (117 g.) of liquid cyanogen chloride (at 0° C.) containing 3.8 g. of azo-bis-isobutyronitrile initiator and 1.0 g. of sodium cyanide. The tube was then placed in a pendulum-type shaking machine and connected to a pressure gauge and a source of dry ethylene under pressure. Sufficient ethylene was then added to the tube at 20° C. to bring the total pressure up to about 1200 lbs./sq. in. The tube was then continuously agitated at the rate of one stroke/second while being heated at a uniform rate to a temperature of 80° C. A period of 20 min. was required for the heating. The temperature was then kept at 80° C. for a period of 125 min. while agitation was maintained; the pressure was held at about 5000 lbs./sq. in. by the addition of more ethylene as required. The temperature was then raised to 120° C. for a few minutes to decompose any unused initiator. At the end of the reaction the tube was cooled to 0° C., and the unreacted ethylene was slowly bled off. The mixture of ω-chloronitriles and unreacted cyanogen chloride left in the tube was then poured out. Unreacted cyanogen chloride was then distilled from this mixture by heating to about 90° C. at atmospheric pressure. The crude product mixture was then centrifuged to remove traces of solid by-products, and the clear brown liquid was analyzed by fractional distillation through a heated one-foot spinning-band column under reduced pressure. This method of analysis was shown to give a good evaluation of the chloronitrile telomer products by comparison with other analytical methods in similar runs. A total of 78.0 g. of chloronitrile telomers was obtained, which had the composition shown in Table I.

For comparison, a control run in which the 1.0 g. of sodium cyanide was omitted produced only a total of 21.5 g. of telomers under otherwise identical conditions.

Therefore, the addition of sodium cyanide resulted in 3.6 times greater yield.

EXAMPLE 2

Example 1 was repeated using 1.0 g. $Na_2CO_3$ in place of the sodium cyanide. A total of 77.5 g. of chloronitrile telomers of the composition shown in Table I was obtained.

EXAMPLE 3

Example 1 was repeated using 3.0 g. $CaCO_3$ in place of the sodium cyanide. A total of 52.0 g. of chloronitrile telomers of the composition shown in Table I was obtained.

EXAMPLE 4

Example 1 was repeated using 1.0 g. $Ni(CN)_2$ in place of the sodium cyanide. A total of 28.5 g. of chloronitrile telomers of the composition shown in Table I was obtained. This was only a slight improvement over the 21.5 g. yield obtained in the control run with no added salt, and illustrates the unexpected advantage of using an alkaline salt of a basic metal oxide and a weak acid. This is further illustrated by another run in which 1.0 g. of anhydrous $FeCl_3$ was substituted for the sodium cyanide of Example 1. Only 10 g. of chloronitrile telomers was obtained. It is evident that this heavy metal salt of a strong acid suppresses the desired reaction.

The previous examples have illustrated embodiments of the invention where the salt is added to the reaction mixture. According to another embodiment the cyanogen chloride is pretreated with the salt, distilled and then used in the telomerization without further addition of the salt. This makes it possible to recover excess salt-treated cyanogen chloride from previous runs and reuse it without adding more of the salt. This is illustrated by the following example:

EXAMPLE 5

Unreacted cyanogen chloride was recovered from the crude product mixture obtained in Example 1 and similar runs. The cyanogen chloride was distilled, with separation of a 5%–95% cut for reuse. Example 1 was repeated, using this recovered cyanogen chloride and omitting the sodium cyanide. A total of 59.5 g. of chloronitrile telomers of the composition shown in Table I was obtained.

*Table I*

PRODUCTS OBTAINED FROM $CNCl/C_2H_4$ TELOMERIZATION WITH AZO-BIS-ISOBUTYRONITRILE INITIATOR

| Example No. | Salt Added | Wt. of Product | Wt. Percent of Chloronitrile Telomer | | | | |
|---|---|---|---|---|---|---|---|
| | | | $C_3$ | $C_5$ | $C_7$ | $C_9$ | Higher |
| 1 | NaCN | 78.0 | 8 | 25.4 | 24.3 | 17.2 | 24 |
| Control | None | 21.5 | 7 | 23 | 24 | 18 | 28 |
| 2 | $Na_2CO_3$ | 77.5 | 12 | 24.4 | 23.0 | 15.5 | 23 |
| 3 | $CaCO_3$ | 52.0 | 10 | 26.4 | 25.3 | 16.1 | 22 |
| 4 | $Ni(CN)_2$ | 28.5 | 10 | 23 | 23 | 15 | 27 |
| 5 | NaCN* | 59.5 | 11 | 24.0 | 23.7 | 15.0 | 22 |

*Cyanogen chloride used in Ex. 5 was recovered from runs in which NaCN was used and no further addition was made.

EXAMPLE 6

A 325 cc., silver-lined shaker tube, capable of withstanding high pressures, was purged three times with nitrogen, evacuated to about 0.5 mm. of mercury absolute pressure, and then cooled in a mixture of ice and water. The tube was charged with 100 cc. (117 g.) of liquid cyanogen chloride (at 0° C.) containing 0.85 g. of di-tertiary-butyl peroxide and 1.0 g. of sodium cyanide. The tube was then placed in a pendulum-type shaking machine and connected to a pressure gauge and a source of dry ethylene under pressure. Sufficient ethylene was then added to the tube at about 25° C. to bring the total pressure up to about 600 lbs./sq. in. The tube was then continuously agitated at the rate of one stroke/second while being heated at a uniform rate to a temperature of 145° C. A period of 50 min. was required for the heating. The temperature was then kept at 145° C. for a period of 65 min. while agitation was maintained; the pressure was held at about 3000 lbs./sq. in. by the addition of more ethylene as required. The reaction temperature was finally raised to 160° C. for 25 minutes. The tube was then cooled to 0° C. and the unreacted ethylene was slowly bled off. The resulting reaction mixture was analyzed as in Example 1. A total of 39.5 g. chloronitrile telomers of the composition shown in Table II was obtained.

For comparison, a control run in which the 1.0 g. of sodium cyanide was omitted produced only a total of 18.0 g. of telomers under otherwise identical conditions. Therefore, the addition of sodium cyanide resulted in 2.2 times greater yield.

An excessive amount of the salt should not be present during the telomerization reaction. When Example 6 was repeated with 10.0 g. of sodium cyanide, this greatly increased amount of salt resulted in considerable tar formation.

EXAMPLE 7

Example 6 was repeated using 1.0 g. $CaCO_3$ in place of the sodium cyanide. A total of 27.6 g. of chloronitrile telomers of the composition shown in Table II was obtained.

EXAMPLE 8

Example 6 was repeated except that the tube was charged with 200 cc. of liquid cyanogen chloride containing 1.63 g. of di-tertiary-butyl peroxide and 2.0 g. of sodium cyanide, sufficient ethylene was added to bring the total pressure to about 400 lbs./sq. in. in 40 minutes, and the reaction mixture was kept at 145° C. for 125 minutes under 3000 lbs./sq. in. ethylene pressure. A total of 41.5 g. of chloronitrile telomers of the composition shown in Table II was obtained.

EXAMPLE 9

Unreacted cyanogen chloride was recovered from the crude product mixture obtained in Example 8 and distilled, with separation of a 5%–95% cut for reuse. Example 6 was repeated, using this recovered cyanogen chloride and omitting the sodium cyanide. A total of 37.6 g. of chloronitrile telomers of the composition shown in Table II was obtained.

EXAMPLE 10

Unreacted cyanogen chloride was recovered from a previous run in which sodium cyanide was used. Example 6 was repeated except that this recovered cyanogen chloride was used, the sodium cyanide was omitted, the tube was heated to 170° C. in 40 minutes, and the reaction mixture was kept at 170° C. for 120 minutes under 3000 lbs./sq. in. ethylene pressure. A total of 33.2 g. of chloronitrile telomers of the composition shown in Table II was obtained.

*Table II*

PRODUCTS OBTAINED FROM $CNCl/C_2H_4$ TELOMERIZATION WITH DI-TERTIARY-BUTYL PEROXIDE INITIATOR

| Example No. | Salt Added | Wt. of Product | Wt. Percent of Chloronitrile Telomer | | | | |
|---|---|---|---|---|---|---|---|
| | | | $C_3$ | $C_5$ | $C_7$ | $C_9$ | Higher |
| 6 | NaCN | 39.5 | 7.6 | 37.3 | 24.6 | 15.4 | 5.6 |
| Control | None | 18.0 | 7.8 | 38.9 | 24.4 | 15.0 | 10.0 |
| 7 | $CaCO_3$ | 27.6 | 9.7 | 33.4 | 19.7 | 14.1 | 8.7 |
| 8 | NaCN | 41.5 | 18.3 | 47.0 | 12.0 | 2.5 | 0.9 |
| 9 | NaCN* | 37.6 | 5.7 | 31.8 | 20.5 | 10.7 | 7.7 |
| 10 | NaCN* | 33.2 | 8.8 | 34.3 | 23.2 | ------ | 16.0 |

*Cyanogen chloride used in Exs. 9 and 10 was recovered from runs in which NaCN was used and no further addition was made.

Since many different embodiments of the invention may be made without departing from the spirit and scope thereof, it is to be understood that the invention is not limited by the specific illustrations except to the extent defined in the following claims.

What is claimed is:

1. The process for preparing ω-chloronitriles of the formula $Cl(CH_2CH_2)_nCN$, wherein $n$ is an integer from 1 to 6, which comprises treating cyanogen chloride with an alkaline salt of a basic metal oxide and a weak acid, said metal being from groups I to II of the periodic system, reacting the cyanogen chloride with ethylene under super-atmospheric pressure at a temperature of 65° to 190° C. in the presence of a telomerization initiator selected from the group consisting of organic peroxides and aliphatic azo compounds, and separating the resulting chloronitriles from the reaction mixture.

2. The process for preparing ω-chloronitriles of the formula $Cl(CH_2CH_2)_nCN$, wherein $n$ is an integer from 1 to 6, which comprises treating cyanogen chloride with 0.05 to 10% by weight of an alkaline salt selected from the group consisting of the cyanide and normal carbonate salts of the basic alkali and alkaline earth metal oxides, reacting the cyanogen chloride with ethylene under super-atmospheric pressure at a temperature of 65° to 190° C. in the presence of a telomerization initiator selected from the group consisting of organic peroxides and aliphatic azo compounds, and separating the resulting chloronitriles from the reaction mixture.

3. The process for preparing ω-chloronitriles of the formula $Cl(CH_2CH_2)_nCN$, wherein $n$ is an integer from 1 to 6, which comprises reacting cyanogen chloride containing 0.05 to 10% by weight of an alkaline salt of a basic metal oxide and a weak acid, said metal being from groups I to II of the periodic system, with ethylene under super-atmospheric pressure at a temperature of 65° to 190° C. in the presence of a telomerization initiator selected from the group consisting of organic peroxides and aliphatic azo compounds, and separating the resulting chloronitriles from the reaction mixture.

4. The process for preparing ω-chloronitriles of the formula $Cl(CH_2CH_2)_nCN$, wherein $n$ is an integer from 1 to 6, which comprises distilling cyanogen chloride from a reaction mixture containing cyanogen chloride and an alkaline salt of a basic metal oxide and a weak acid, said metal being from groups I to II of the periodic system, reacting the cyanogen chloride distillate with ethylene under super-atmospheric pressure at a temperature of 65° to 190° C. in the presence of a telomerization initiator selected from the group consisting of organic peroxides and aliphatic azo compounds, and separating the resulting chloronitriles from the reaction mixture.

5. The process for preparing ω-chloronitriles of the formula $Cl(CH_2CH_2)_nCN$, wherein $n$ is an integer from 1 to 6, which comprises treating cyanogen chloride with a cyanide salt of a basic alkali metal oxide, reacting the cyanogen chloride with ethylene under super-atmospheric pressure at a temperature of 65° to 190° C. in the presence of a telomerization initiator selected from the group consisting of organic peroxides and aliphatic azo compounds, and separating the resulting chloronitriles from the reaction mixture.

6. The process for preparing ω-chloronitriles of the formula $Cl(CH_2CH_2)_nCN$, wherein $n$ is an integer from 1 to 6, which comprises treating cyanogen chloride with a normal carbonate salt of a basic alkali metal oxide, reacting the cyanogen chloride with ethylene under super-atmospheric pressure at a temperature of 65° to 190° C. in the presence of a telomerization initiator selected from the group consisting of organic peroxides and aliphatic azo compounds, and separating the resulting chloronitriles from the reaction mixture.

7. The process for preparing ω-chloronitriles of the formula $Cl(CH_2CH_2)_nCN$, wherein $n$ is an integer from 1 to 6, which comprises treating cyanogen chloride with a normal carbonate salt of a basic alkaline earth metal oxide, reacting the cyanogen chloride with ethylene under super-atmospheric pressure at a temperature of 65° to 190° C. in the presence of a telomerization initiator selected from the group consisting of organic peroxides and aliphatic azo compounds, and separating the resulting chloronitriles from the reaction mixture.

References Cited in the file of this patent

UNITED STATES PATENTS

| 2,653,963 | Cowen et al. | Sept. 29, 1953 |
| 2,745,864 | Dixon | May 15, 1956 |

FOREIGN PATENTS

| 1,096,992 | France | Feb. 9, 1955 |

UNITED STATES PATENT OFFICE
CERTIFICATE OF CORRECTION

Patent No. 2,848,476                                                          August 19, 1958

William L. Kohlhase, et al.

It is hereby certified that error appears in the printed specification of the above numbered patent requiring correction and that the said Letters Patent should read as corrected below.

Column 3, Table I, seventh column, for the heading "$C_8$" read -- $C_9$ --.

Signed and sealed this 31st day of March 1959.

(SEAL)
Attest:

KARL H. AXLINE
Attesting Officer

ROBERT C. WATSON
Commissioner of Patents